2,892,851
11-OXYGENATED DERIVATIVES OF 9-FLUORO-17-ACYLOXYPROGESTERONES

Clarence G. Bergstrom, Chicago, and Raymond M. Dodson, Park Ridge, Ill., assignors to G. D. Searle & Co., Chicago, Ill., a corporation of Delaware No Drawing. Application May 19, 1958
Serial No. 735,931

7 Claims. (Cl. 260—397.45)

The present invention relates to a new group of highly potent orally active 9α-halo steroids and more particularly to the 11-oxygenated derivatives of 9α-fluoro-17α-acyloxy-4-pregnene-3,20-diones of the general structural formula

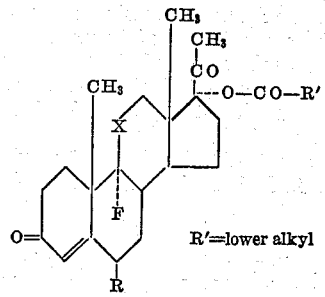

R′=lower alkyl wherein R is a hydrogen or a lower alkyl group and X is a carbonyl, hydroxymethylene or acyloxymethylene radical.

In the foregoing formula the lower alkyl group R is preferably methyl and the R′—CO-group in the 17α-position is an acyl radical derived from a lower alkanoic acid such as acetic, propionic, butyric, pentanoic and hexanoic acid. The acyl moiety of the acyloxymethylene group which X can represent can be of the same type or formyl.

The esters of this invention show a far higher order of progestational activity than the 17α-hydroxy compounds. Also, these esters produce a relatively low degree of interfering hormonal side reactions.

The invention will appear more fully from the following examples which are given for purposes of illustration only and are not to be construed as limiting the invention in spirit or in scope. Quantities are given as parts by weight.

*Example 1*

A mixture of 0.62 parts of 9α-fluoro-17α-hydroxy-4-pregnene-3,11,20-trione and 26 parts of glacial acetic acid is stirred for 10 minutes while a brisk stream of nitrogen is bubbled through the solution. Then 0.2 parts of p-toluenesulfonic acid monohydrate are added in one portion followed by 2.7 parts of acetic anhydride. The mixture is then stirred in a closed vessel in a nitrogen atmosphere for 12 hours and the resulting solution is poured slowly into 500 parts of stirred ice water. Stirring is continued for an hour after which the white solid is collected on a filter and washed with water. The crude enol acetate thus obtained melts in the range of 95–131° C.

The solution of 0.56 parts of this crude enol acetate in 20 parts of warm methanol is saturated with nitrogen and then treated with 0.3 parts of concentrated hydrochloric acid. After standing for 2 hours, the solution is diluted with 20 parts of water and chilled. The crystalline product is collected on a filter and recrystallized from a mixture of acetone and petroleum ether and then from methanol to yield 9α-fluoro-17α-acetoxy-4-pregnene-3,11,20-trione melting at about 255–257° C. with some sweating at 245° C. An ultraviolet maximum at 235 millimicrons shows an extinction coefficient of about 18,000. The specific rotation in chloroform solution, $[\alpha]_D$, is +112°.

*Example 2*

In the procedure of the foregoing example, 25 parts of propionic acid and 3 parts of propionic anhydride are substituted for the acetic acid and the acetic anhydride respectively and there is thus obtained 9α-fluoro-17α-propionoxy-4-pregnene-3,11,20-trione. The ultraviolet absorption spectrum shows a maximum at about 235 millimicrons with a molecular extinction coefficient of 18,100. Infrared maxima are observed at 5.80, 5.95, 6.18 microns.

*Example 3*

A mixture of 1 part of 6α-methyl-17α-hydroxy-4-pregnene-3,20-dione and 2500 parts of casein digest medium are inoculated with a culture of *Rhizopus nigricans* ATCC 62276 and shaken for four days. The reaction mixture is then extracted with dichloromethane and the extract is evaporated to dryness. The residue is applied to a chromatography column containing 74 parts of silica gel. The column is developed with benzene solutions containing increasing concentrations of ethyl acetate. Elution with 35–50% solutions of ethyl acetate in benzene and concentration of the eluate yields 6α-methyl-11α,17α-dihydroxy-4-pregnene-3,20-dione which is recrystallized successively from acetone and then from a mixture of benzene and cyclohexane.

A mixture of 93 parts of 6α-methyl-11α,17α-dihydroxy 4-pregnene-3,20-dione, 1000 parts of pyridine and 103 parts of p-toluenesulfonyl chloride is maintained at 25° C. for 15 hours. The reaction mixture is then poured into water and the precipitate is collected on a filter and recrystallized successively from dilute acetone and then methanol. The p-toluenesulfonic acid ester of 6α-methyl-11α,17α-dihydroxy-4-pregnene-3,20-dione thus obtained is recrystallized from acetone.

This ester is dissolved in 2500 parts of 2,4,6-collidine and heated under reflux for an hour. The reaction mixture is then poured into ice cold, dilute, aqueous hydrochloric acid. The precipitate is collected on a filter and washed with water. This precipitate is dissolved in an 8% solution of ethyl acetate in benzene and applied to a chromatography column containing 2000 parts of silica gel. The column is first washed with 31,000 parts of a 10% solution of ethyl acetate in benzene. It is then diluted with 66,000 parts of a 20% solution of ethyl acetate in benzene. Crystallization of the residue obtained from this eluate from dilute methanol yields crystals of 6α-methyl-17α-hydroxy-4,9:11-pregnadiene-3,20-dione.

A solution of 12 parts of 6α-methyl-17α-hydroxy-4,9:11-pregnadiene13,20-dione in 600 parts of pure dioxane is treated with 100 parts of water, 350 parts of 1-N perchloric acid and then with 7 parts of N-bromoacetamide. The reaction mixture is shaken for four minutes; an orange color starts to develop. The reaction mixture is decolorized by addition of aqueous sodium sulfite solution and diluted with water. The resulting precipitate is collected on a filter and recrystallized from a mixture of ethyl acetate and a small amount of methanol.

A solution of the 6α-methyl-9α-bromo-11β,17α-dihydroxy-4-pregnene-3,20-dione thus obtained and 50 parts of potassium acetate in 500 parts of ethanol is heated on the steam bath for one hour, diluted with water and permitted to stand to allow crystallization of the 6α-methyl-9:11β-epoxy-17α-hydroxy-4-pregnene-3,20-dione.

A solution of 2.15 parts of this epoxide in 315 parts of freshly purified chloroform is cooled to 2° C. and a vigorous stream of anhydrous hydrofluoric acid is passed into the solution for 2 minutes. The color changes from pale yellow to deep purple. Two and a half minutes after the start of the reaction the mixture is poured into 500 parts of saturated sodium bicarbonate solution. The chlororom layer is separated and the aqueous phase is reextracted with chloroform. The combined chloroform solutions are dried over anhydrous calcium sulfate, filtered and distilled to dryness in vacuo under nitrogen. The partially crystalline yellow gummy residue is crystallized from acetone. The 6α-methyl-9α-fluoro-11β,17α-dihydroxy-4-pregnene-3,20-dione is thus obtained. The ultraviolet absorption spectrum shows a maximum at 238 millimicrons with a molecular extinction coefficient of 17,000. The infrared absorption spectrum shows maxima at 2.94, 5.89, 6.09, and 6.18 microns.

A solution of 3 parts of 6α-methyl-9α-fluoro-11β,17α-dihydroxy-4-pregnene-3,20-dione in 20 parts of pyridine is added to 3 parts of chromic anhydride in 30 parts of pyridine. After standing at room temperature for 15 hours, the reaction mixture is stirred with three 250-part portions of ethyl acetate to extract the product from a brown slurry which is formed during the oxidation. The combined ethyl acetate extracts are washed successively with water, 1-N hydrochloric acid, water, saturated aqueous sodium bicarbonate solution and again with water, dried over anhydrous calcium sulfate, filtered and evaporated under vacuum to yield a gummy yellow product. Two crystallizations from acetone yield pure 6α-methyl - 9α - fluoro - 17α - hydroxy - 4 - pregnene - 3, 11,20-trione. The ultraviolet absorption spectrum shows a maximum at 235 millimicrons with a molecular extinction coefficeint of 12,700. The infrared absorption spectrum shows maxima at 2.86, 5.85, 5.90, 6.07 and 6.18 microns.

Example 4

A mixture of 6.5 parts of 6α-methyl-9α-fluoro-17α-hydroxy-4-pregnene-3,11,20-trione and 300 parts of glacial acetic acid is saturated with nitrogen and then treated first with 2 parts of p-toluenesulfonic acid and then with 27 parts of acetic anhydride. The reaction mixture is maintained in a nitrogen atmosphere and stirred for 12 hours and then poured into a large volume of ice water. After an hour of further stirring the precipitate is collected on a filter and washed with water. The precipitate is then dissolved in 250 parts of warm methanol, saturated with nitrogen and treated with 3 parts of concentrated hydrochloric acid. After standing for 2 hours under nitrogen the solution is diluted with water and the resulting precipitate is collected on a filter and recrystallized successively from a mixture of acetone-petroleum-ether and then from methanol to yield 6α-methyl-9α-fluoro-17α-acetoxy-4-pregnene-3,11,20-trione. The ultraviolet absorption spectrum shows a maximum at about 235 millimicrons with a molecular extinction coefficient of about 18,000. Infrared maxima are observed at 5.80, 6.00, 6.19 and 8.01 microns.

Example 5

In the procedure of the preceding example, 300 parts of butyric acid and 35 parts of butyric anhydride are substituted for the acetic acid and acetic anhydride respectively, and there is thus obtained 6α-methyl-9α-fluoro-17α-butyroxy-4-pregnene-3,11,20-trione. The ultraviolet absorption spectrum shows a maximum at about 235 millimicrons with a molecular extinction coefficient of about 17,800.

Example 6

A mixture of 1 part of 9α-fluoro-11β,17α-dihydroxy-4-pregnene-3,20-dione, 0.4 part of p-toluenesulfonic acid monohydrate and 11 parts of acetic anhydride in 105 parts of glacial acetic acid is stirred under nitrogen at room temperature of 20 hours, cooled and treated with 40 parts of water. After 4 hours storage at 0° C. the aqueous milky mixture is extracted with ethyl acetate. This extract is washed successively with water, saturated sodium bicarbonate solution and again with water, dried over anhydrous calcium sulfate, filtered and taken to dryness at reduced pressure. The resulting gummy residue is dissolved in 40 parts of methanol and then 0.4 parts of concentrated aqueous hydrochloric acid are added in a nitrogen atmosphere. After 2 hours at room temperature water is added and the crude product is applied to a chromatography column packed with silica gel. The column is developed with benzene solutions containing increasing concentrations of ethyl acetate. Elution with a 15% solution of ethyl acetate in benzene and crystallization of the residue first from a mixture of benzene and petroleum ether and then from acetone and petroleum ether yields 9α-fluoro-11β,17α-diacetoxy-4-pregnene-3,20-dione melting at 253–257° C. An ultraviolet maximum is observed at 236 millimicrons with an extinction coefficient of about 19,300. Infrared maxima are observed at 5.74, 5.96, 6.18 and 8.02 microns.

Further elution of the column with 15–25% ethyl acetate in benzene and successive recrystallization of the residue from a mixture of benzene and petroleum ether and then a mixture of ethyl acetate and petroleum ether yields 9α-fluoro-11β-hydroxy-17α-acetoxy-4-pregnene-3,20-dione melting at about 230–237° C. An ultraviolet maximum at 238.5 millimicrons has an absorption coefficient of about 15,700. Infrared maxima are seen at 2.81, 5.77, 5.95, 6.03, 6.16, and 7.92 microns.

Example 7

Substitution of an equivalent amount of propionic acid and propionic anhydride for the acetic acid and anhydride in the preceding example yields first 9α-fluoro-11β,17α-dipropionoxy-4-pregnene-3,20-dione which shows infrared maxima at about 5.75, 5.97, and 8 microns and an ultraviolet maximum at about 236 millimicrons with an extinction coefficient of about 19,000. Further elution yields 9α-fluoro-11β-hydroxy-17α-propionoxy-4-pregnene-3,20-dione which shows infrared maxima at 2.8, 5.77, 5.95, 6.02, 6.15 and 7.9 microns and an ultraviolet maximum at about 238 millimicrons with an extinction coefficient of about 15,800.

What is claimed is:

1. A compound of the formula

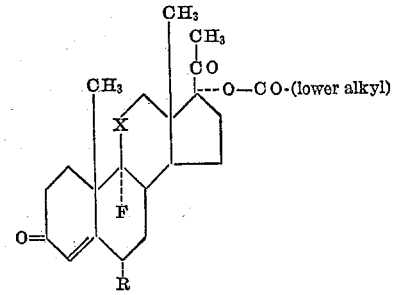

wherein R is a member of the class consisting of hydrogen and methyl and X is a member of the class consisting of carbonyl, β-hydroxymethylene and β-acyloxymethylene, the acyl group being that of an alkanoic acid of less than 7 carbon atoms.

2. A compound of the formula

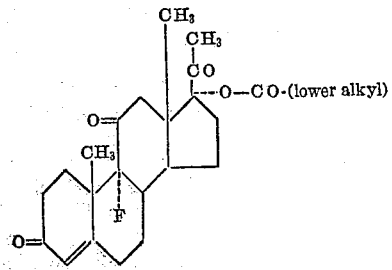

3. 9α-fluoro-17α-acetoxy-4-pregnene-3,11,20-trione.
4. A compound of the formula
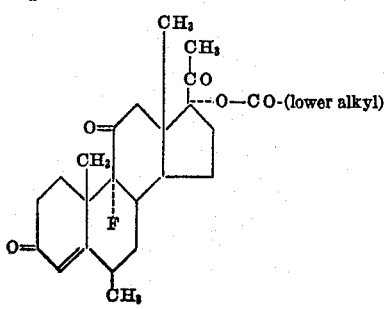
5. 6α - methyl - 9α - fluoro - 17α - acetoxy - 4 - pregnene-3,11,20-trione.
6. 9α - fluoro - 11β - hydroxy - 17α - acetoxy - 4 - pregnene-3,20-dione.
7. 9α - fluoro - 11β,17α - diacetoxy - 4 - pregnane - 3,20-dione.
References Cited in the file of this patent
UNITED STATES PATENTS
| | | |
|---|---|---|
| 2,763,671 | Fried et al. | Sept. 18, 1956 |
| 2,835,680 | Fried | May 20, 1958 |

UNITED STATES PATENT OFFICE

Certificate of Correction

Patent No. 2,892,851　　　　　　　　　　　　　　　　　　　　　　June 30, 1959

Clarence G. Bergstrom et al.

It is hereby certified that error appears in the printed specification of the above numbered patent requiring correction and that the said Letters Patent should read as corrected below.

Column 2, line 51, for "diluted" read —eluted—; line 56, for "13,20-dione" read —3,20-dione—; column 3, line 6, for "chlorororm" read —chloroform—; line 33, for "coefficeint" read —coefficient—; line 74, for "of 20 hours" read —for 20 hours—; column 5, claim 4, the formula should appear as shown below instead of as in the patent—

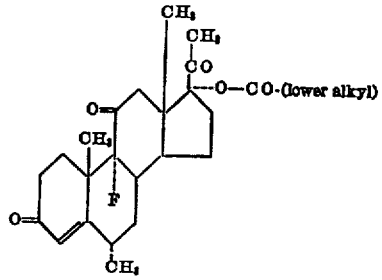

column 6, line 5, for "pregnane" read —pregnene—.

Signed and sealed this 10th day of November 1959.

[SEAL]

Attest:
KARL H. AXLINE,
*Attesting Officer.*

ROBERT C. WATSON,
*Commissioner of Patents.*